(12) United States Patent
Yoshizawa et al.

(10) Patent No.: US 6,259,690 B1
(45) Date of Patent: Jul. 10, 2001

(54) PROGRAMMABLE NETWORK

(75) Inventors: Satoshi Yoshizawa, Saratoga, CA (US); Toshiaki Suzuki, Kokubunji (JP); Mitsuru Ikezawa, Asaka (JP); Itaru Mimura, Sayama (JP); Tatsuya Kameyama, Hachioji (JP)

(73) Assignee: Hitachi, LTD, Tokyo (JP)

( * ) Notice: Subject to any disclaimer, the term of this patent is extended or adjusted under 35 U.S.C. 154(b) by 0 days.

(21) Appl. No.: 09/626,391

(22) Filed: Jul. 26, 2000

Related U.S. Application Data (63) Continuation of application No. 09/391,404, filed on Sep. 8, 1999.

(30) Foreign Application Priority Data

Sep. 8, 1998 (JP) .................................................. 10-254228

(51) Int. Cl.[7] .................................................. H04L 12/28
(52) U.S. Cl. .................................................. 370/351
(58) Field of Search .................................. 370/351, 389, 370/390, 392, 394, 428

(56) References Cited

U.S. PATENT DOCUMENTS

| 5,473,609 | * | 12/1995 | Chaney | 370/312 |
|---|---|---|---|---|
| 5,563,648 | * | 10/1996 | Menand et al. | 348/13 |
| 5,619,501 | * | 4/1997 | Tamer et al. | 370/392 |
| 5,666,293 | * | 9/1997 | Metz et al. | 709/220 |
| 6,172,990 | * | 1/2001 | Deb et al. | 370/474 |
| 6,185,568 | * | 2/2001 | Douceur et al. | 707/10 |

FOREIGN PATENT DOCUMENTS 715609   1/1995   (JP) .

OTHER PUBLICATIONS

"A Survey of Active Network Research" IEEE Communication Magazine, 1997, Jan. pp. 80–86.

* cited by examiner

Primary Examiner—David R. Vincent
(74) Attorney, Agent, or Firm—Antonelli, Terry, Stout & Kraus, LLP (57) ABSTRACT

At each network node, a packet classification unit makes a judgement to transfer only a packet necessary to be processed by software to a packet processing program processor and transfer other packets directly to a routing processor. Processing history information indicating the process history executed at each network node on a network route is transferred to the other network nodes so that other network nodes can store the processing history information in respective processing history repository table. Each node refers to this table and further transfers only the packet necessary to be processed by software to the packet processing processor.

3 Claims, 12 Drawing Sheets

PROGRAMMABLE NETWORK

This is a continuation of application Ser. No. 09/391,404, filed Sep. 8, 1999.

BACKGROUND OF THE INVENTION

The present invention relates to a programmable network in which in a network system interconnecting a plurality of computers via a network, a program is loaded to a network node on a route of a flow constituted of packets, and the node executes the program for each packet.

For a network system in which data is processed and then transmitted, a method is known by which a video is compressed and packetized for each wavelet band, as disclosed in JP-A-7-15609. The invention provides a video transfer method, a video transmitter, a video receiver and an video transfer apparatus, in which a video is transferred in accordance with a network bandwidth on a video reception side and a decoding capability of the decoder, even if which capabilities are inferior to a network bandwidth on a video transmission side and an encoding capability of the encoder. The video transmitter packetizes video data for each wavelet band, adds a predetermined classifier to the packet, and then transmits it. If video data transmitted by ATM (Asynchronous Transfer Mode) network, a priority order is added to a cell header to transmit a cell. On the network which transfers video data, a cell having a higher priority order is transferred with a priority over other cells when the network is congested. The video receiver checks the classifier of the received video data, selects only necessary video data and decodes it in accordance with the decoding capability of the decoder to reproduce the video data.

A programmable network is known as described in "A Survey of Active Network Research" in "IEEE Communications Magazine", January issue of 1997, at pp. 80–86. In the programmable network, each network node constituting the network executes a packet processing program for each packet. For example, the above-described transfer with a priority order by ATM is realized by software using a program loaded at each network node. This system can be realized on the network having a QoS (Quality of Service) control function of ATM, e.g., on an IP (Internet Protocol) network such as the Internet.

For the IP network, techniques are also known by which a routing process for controlling a route of packets via network nodes can be speeded up by using a dedicated processor.

In the programmable network system according to the conventional techniques described above, all packets are processed by software using a program loaded at each network node. Therefore, although packets to be processed by software and packets not to be processed are both input to a network node, software processing is performed for both types of the packets so that a process efficiency is not good.

SUMMARY OF THE INVENTION

It is an object of the present invention to provide a programmable network for processing a packet by a packet processing program at each program node. Only the packet necessary to be processed is processed and the packet unnecessary to be processed is transferred to a routing processor, so that a transmission speed can be improved and the throughput of the programmable network can be improved.

It is another object of the present invention to provide a method of loading a program in associated program nodes of a network dynamically and efficiently.

In order to achieve the above object, a network node constituting a network comprises: a program processor for executing a packet processing program to each packet corresponding to a flow; a routing processor for performing a routing process for an input packet; and a packet classification unit for analyzing the input packet to transfer a packet belonging to the flow to the program processor and transfer other packets to the routing processor. The network node has a function of receiving the packet processing program via the network and making it executable.

DETAILED DESCRIPTION OF THE EMBODIMENTS (1) Structure and Outline of System

Figure 2:
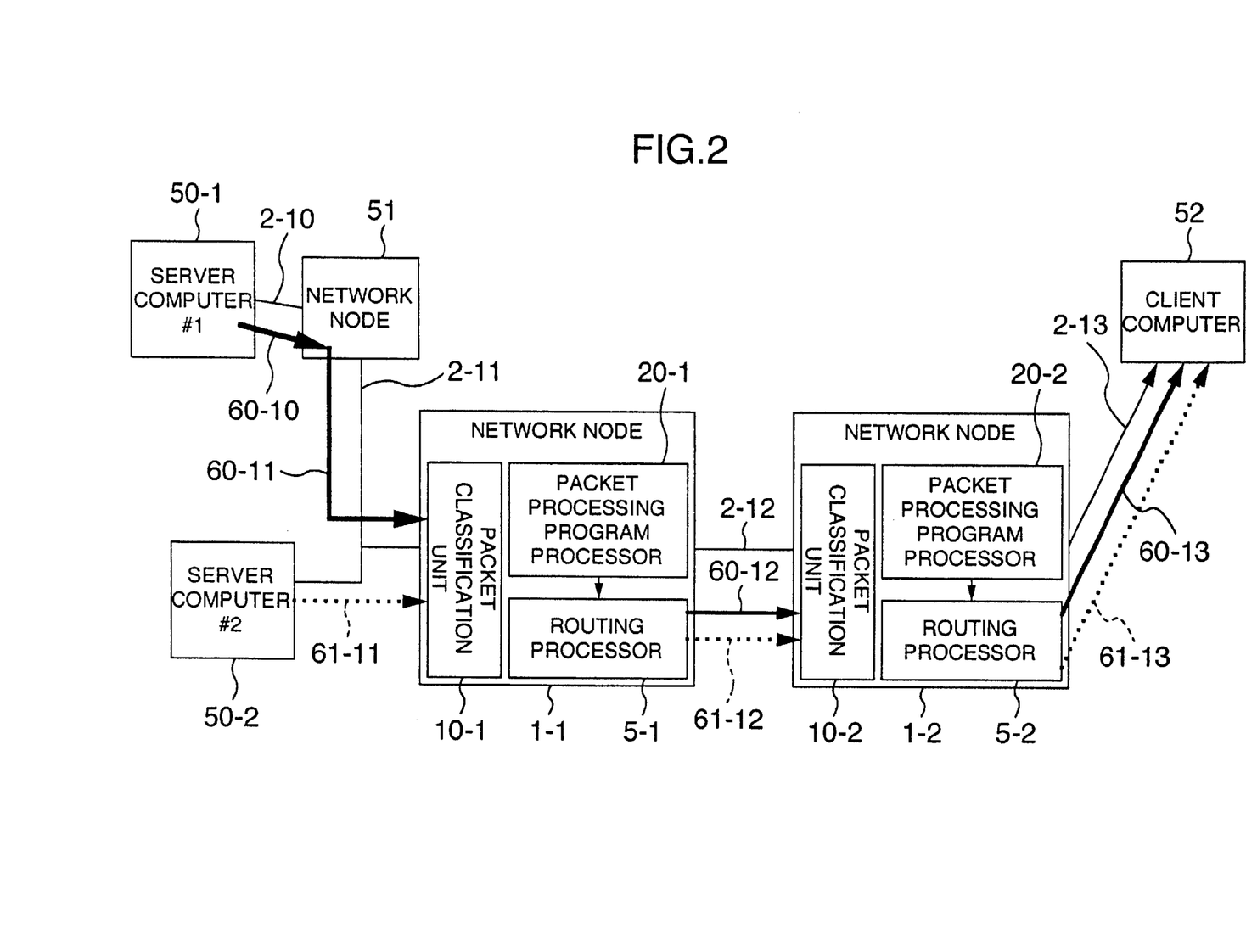
FIG. 2 is a block diagram explaining the structure and operation of the programmable network system according to the invention.

FIG. 2 is a block diagram explaining an example of the structure and operation of a programmable network system.

As shown in FIG. 2, the programmable network system of this embodiment is constituted of networks 2, server computers 50, network nodes 1, 51, and client computers 52.

The network may be the Internet, LAN or the like. The network node is a network apparatus such as a router and a gateway. The numbers of server computers, client computers and network nodes are not limited to this embodiment.

If there are a plurality of network nodes 1, they are represented by 1-1, 1-2, . . . with branch numbers. The same notation is also applied to the server computer 50 and network 2.

It is assumed that a server computer 50-1 transmits a flow 60 representative of a series of data and a server computer 50-2 transmits a flow 61, respectively to the networks 2.

A plurality of network nodes are provided in order to interconnect networks and it is assumed that conventional network nodes 51 and programmable network nodes 1-1, 1-2 are used in a mixed state.

The programmable network node has a packet classification unit 10, a packet processing program processor 20 and a routing processor 5.

The server computer 50-1 transmits in advance a packet processing program to the packet processing program processor 20 at the network node 1-1, 1-2 to make the packet processing program executable so as to execute a software process for a data packet to be transmitted.

It is assumed herein that the packet processing program processes a data packet belonging to the flow 60 and does not process a data packet belonging to the flow 61.

At the network node 1-1, 1-2, the packet classification unit 10 controls a next destination of each data packet belonging to the flow 60 from the server computer 50-1 to the client computer 52, in order to allow each packet processing program processor 20 to execute the packet processing program (refer to bold lines 60-10 to 60-13 in FIG. 2).

The packet belonging to the flow 61 from the server computer 50-2 to the client computer 52 is not necessary to be processed by the packet processing program. Therefore, at the network node 1-1, 1-2, the packet classification unit 10 controls a next destination of each data packet so that the data packet is processed directly by the routing processor 5 without being transferred to the packet processing program processor 20 (refer to broken lines 61-11 to 61-13 in FIG. 2).

(2) Programmable Network Node: First Embodiment

Next, of the network nodes described above, the network node of the type having the packet processing program processor 20 will be detailed as to its structure.

Figure 1:
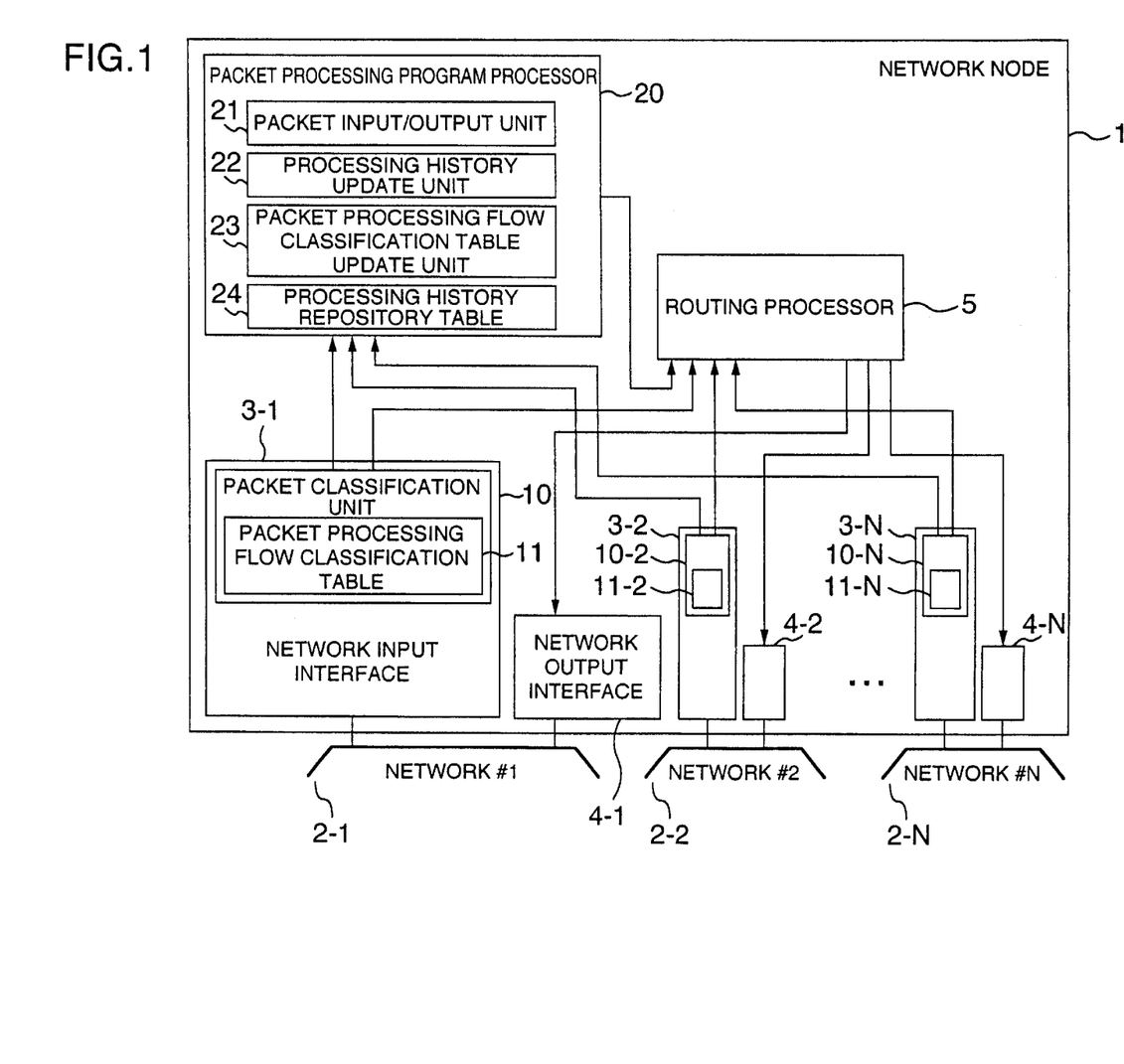
FIG. 1 is a block diagram showing the structure of a network node of a programmable network system according to this invention.

As shown in FIG. 1, the network node 1 of the embodiment is constituted of a network input interface 3, a network output interface 4, a routing processor 5 and a packet processing program processor 20. The network input interfaces 3 (3–$i$, $i=1, \ldots, N$) and network output interfaces 4 (4–$i$, $i=1, \ldots, N$) are connected to N networks 2 (2–$i$, $i=1, \ldots, N$) at their inputs and outputs.

Each network input interface 3 is provided with a packet classification unit 10 which has a packet processing flow classification table 11. The packet processing flow classification table 11 stores information for judging whether a packet belonging to each flow is to be transferred to the packet processing program processor 20 or directly to the routing processor 5.

The packet processing program processor 20 is made of a CPU and a memory and includes a packet input/output unit 21, a processing history update unit 22, a packet processing flow classification update unit 23, and a processing history repository table 24. The packet processing flow classification update unit 23 has a function of setting information to the packet processing flow classification table 11. The units 21, 22 and 23 are realized by software which is executed by the CPU. The packet processing program is stored in the memory and executed when necessary.

The routing processor 5 controls a route of each packet and is a processor dedicated to a routing process.

This embodiment will be described by taking as an example that the server computer 50 transmits hierarchically encoded video data 60-10. The server computer 50 transmits compressed data by using a packet different for each frequency band. The programmable network node discards a packet containing high frequency band data in response to a request, and transfers the other packets to the next network node or client computer 52. Prior to data transmission, the server computer 50 transmits to the network nodes, as the packet processing program, a software program for checking the frequency band of a data packet and judging whether the data packet is discarded or transferred. The packet processing program has a function of determining the frequency band of a data packet to be discarded at the network node and storing this information, in response to a request from the server computer 50 or client computer 52 and/or in response to a check result of the status of networks to be connected. It is assumed herein that the packet processing program has a function of determining a discard packet frequency band and notifying it to an external software program, in response to a request from the external software program.

Figure 3:
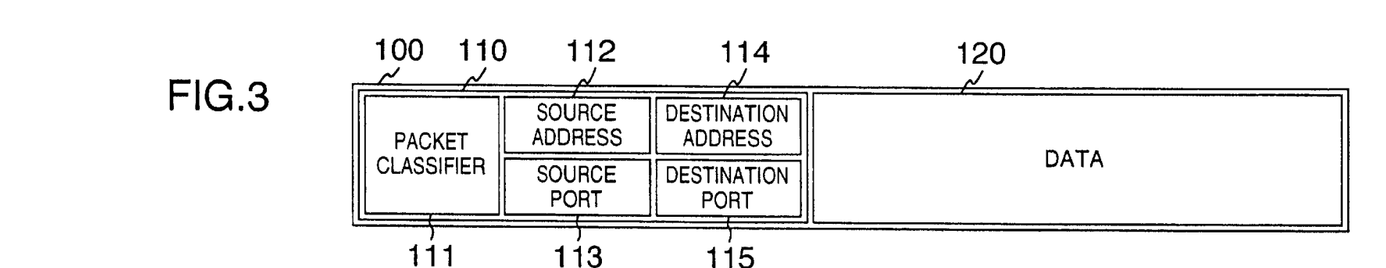
FIG. 3 is a diagram showing the format of a packet 100 according to a first embodiment.

The format of a packet to be received at the programmable network node is shown in FIG. 3.

As shown in FIG. 3, the packet 100 is constituted of: a packet header 110 for storing destination information and the like of the packet; and a packet data field 120 for storing data. The packet header 110 is constituted of a packet classifier 111 for classifying a protocol type for the packet, a source address 112 and a source port 113 for identifying a source computer, and a destination address 114 and a destination port 115 for identifying a destination computer. For example, in the case of a widely used IP (Internet Protocol), the source address 112 and destination address 114 correspond to IP addresses, and the source port 113 and destination port 115 correspond to port numbers of TCP/UDP (Transmission Control Protocol)/(User Datagram Protocol). A flow can be discriminated by using these source/destination addresses and ports.

Figure 4:
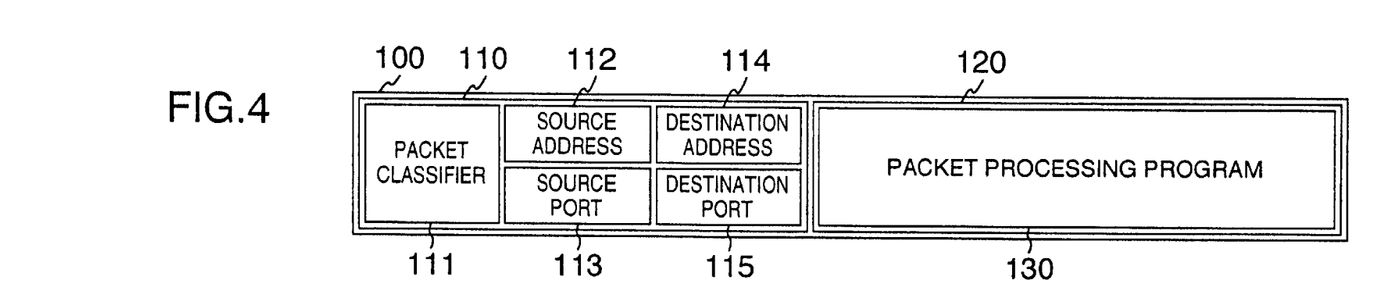
FIG. 4 is a diagram showing the format of the packet 100 shown in FIG. 3 whose packet payload 120 is a packet processing program.

As shown in FIG. 4, there is a packet 100 whose data 120 is a packet processing program 130. FIG. 4 shows the format of a packet which is used when the server computer 50 transmits the packet processing program to the network node 1-1, 1-2 as shown in FIG. 2. The packet processing program 130 may be any type such as an object module executable at the network node 1, a script written by text data, byte codes written by Java language, or the like. If the packet processing program 130 has a length unable to be written in one packet 100, it is possible to transmit it by dividing to a plurality of packets 100. The packet shown in FIG. 4 may include a program module name of the packet processing program 130.

There is another example of a packet 100 whose data 120 corresponds to processing history information. This format of a packet is used when the network node 1-1, 1-2 transmits the processing history information as shown in FIG. 2. Also in this case, if the processing history information 140 has a length unable to be written in one packet 100, it is possible to transmit it by dividing to a plurality of packets 100.

Figure 6:
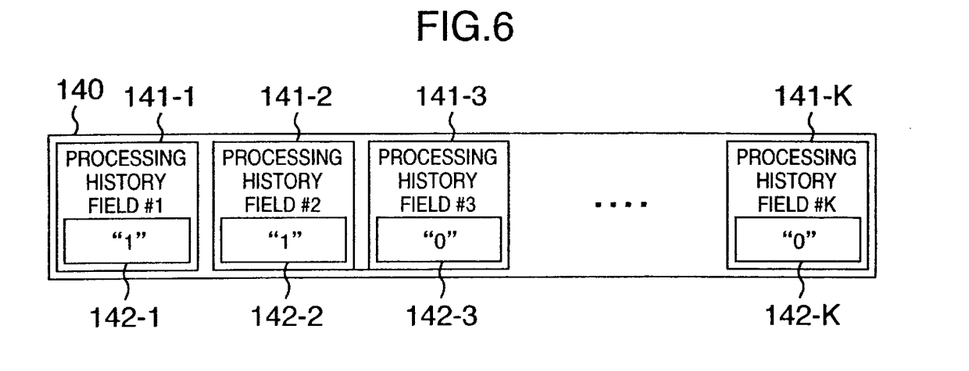
FIG. 6 is a diagram showing the format of the packet history information according to an embodiment.

For example, the processing history information 140 may have the format such as shown in FIG. 6. In this example, the processing history information 140 is constituted of: a bit field (processing history field) 141 for storing "1" or "0" indicating a processing execution history of each frequency band; and its bit information 142. If the hierarchically encoded video data described earlier is to be transmitted, the frequency band is partitioned into K stages in such a manner that a transfer of a packet storing the lowest frequency band is allocated to 141-1 and a transfer of a packet storing the highest frequency band is allocated to 141-K. For example, an initial value "1" is written in each field 142, and "0" is written in the field 142 corresponding to the packet at the frequency band discarded by the packet processing program processor 20. Although the processing history information 140 shown in FIG. 6 is realized by using the bit field, it may be realized by a script written by text data or any other type.

Figure 7:
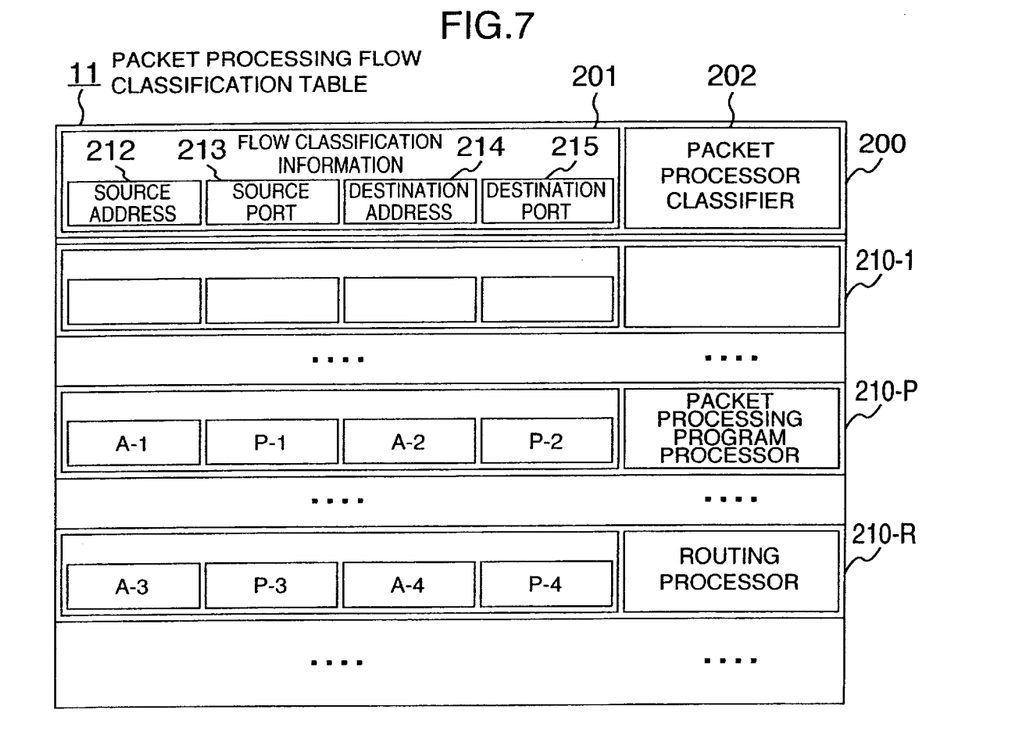
FIG. 7 is a diagram showing the format of a packet processing flow classification table 11 according to a first embodiment.

An example of the format of the packet processing flow classification table 11 is shown in FIG. 7. The packet processing flow classification table 11 is constituted of a flow classification information field 201 and a packet processor classifier field 202.

The flow classification information field 201 is constituted of a source address 212, a source port 213, a destination address 214 and a destination port 215. These addresses and ports 212 to 215 correspond to the addresses and ports 112 to 115 in the packet header 110 shown in FIG. 3. The packet processor classifier field 202 stores a classifier indicating whether the packet 100 is transferred to the packet processing program processor 20 or to the routing processor 5.

The packet processing flow classification table 11 is constituted of a plurality of entries 210. An entry 210-P indicates that the packet constituting the flow represented by the addresses and ports 212 to 215 is transferred to the packet processing program processor 20, whereas an entry 210-R indicates that the packet is transferred to the routing processor 5. These entries 210 are set by the packet processing flow classification table update unit 23 of the packet processing program processor 20, and referred by the packet classification unit 10 of the network input interface 3.

Figure 8:
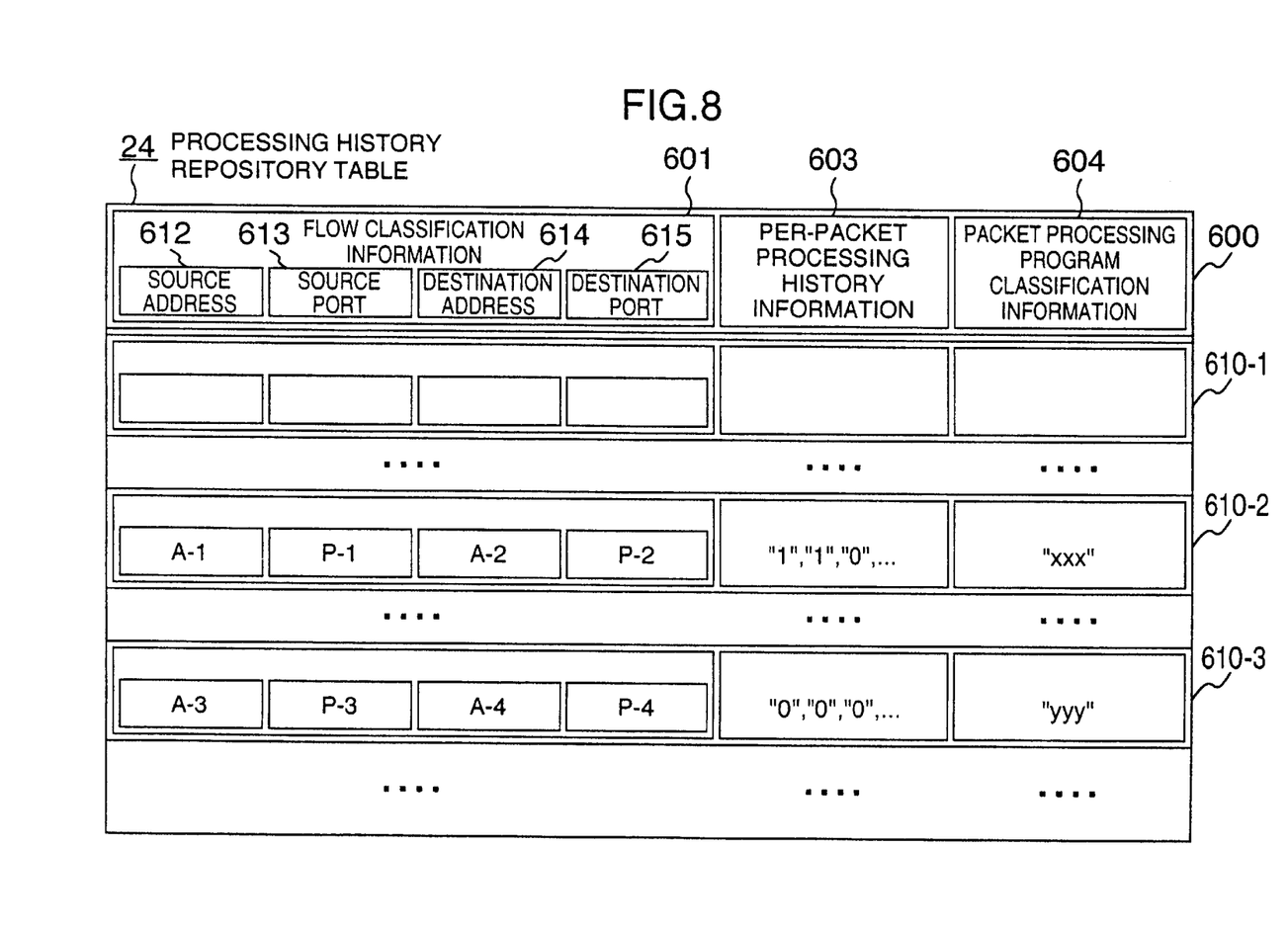
FIG. 8 is a diagram showing the format of a processing history repository table.

An example of the format of the processing history repository table 24 is shown in FIG. 8. In this example, the processing history repository table 24 is constituted of a flow classification information field 601, a per-packet processing history information field 603 and a packet processing program classification information field 604. The flow classification information field 610 is constituted of a source address 612, a source port 613, a destination address 614 and a destination port 615. The addresses and ports 612 to 615 correspond to the addresses and ports 112 to 115 shown in FIG. 3.

Figure 5:
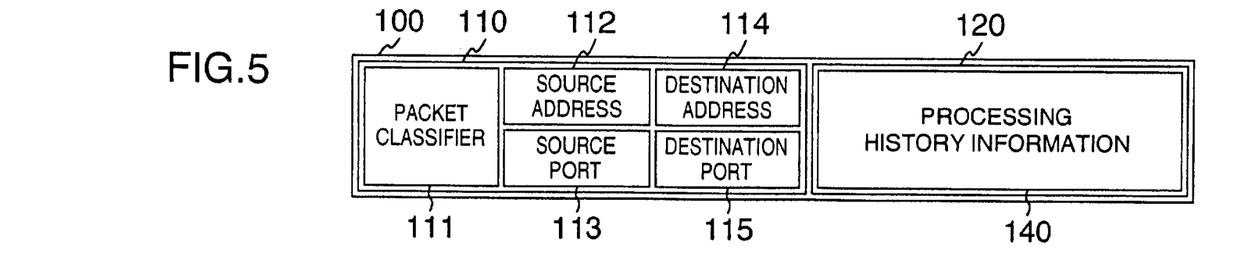
FIG. 5 is a diagram showing the format of the packet 100 shown in FIG. 3 whose packet payload 120 is packet history information 140.

The per-packet processing history information 603 stores the processing history information 140 shown in FIG. 6. The timing when the per-packet processing history information 603 is updated is either the timing when the packet 100 whose data is the processing history information 140 shown in FIG. 5 is transmitted to the network node, or the timing when the processing history update unit 22 updates the per-packet processing history 603 in accordance with the process contents of the packet processing program to be executed at this network node.

The packet processing program classification information 604 stores information of the packet processing program which processes the packet 100, e.g., a program name. The timing when this packet processing program classification information 604 is updated is the timing when the packet 100 whose data is the packet processing program 130 shown in FIG. 3 reaches this network node.

The processing history repository table 24 is constituted of a plurality of entries 610. An entry 610-2 indicates that the packet constituting the flow represented by the addresses and ports 612 to 615 is processed by a packet processing program "xxx", and an entry 610-3 indicates that it is precessed by a packet processing program "yyy".

Figure 9:
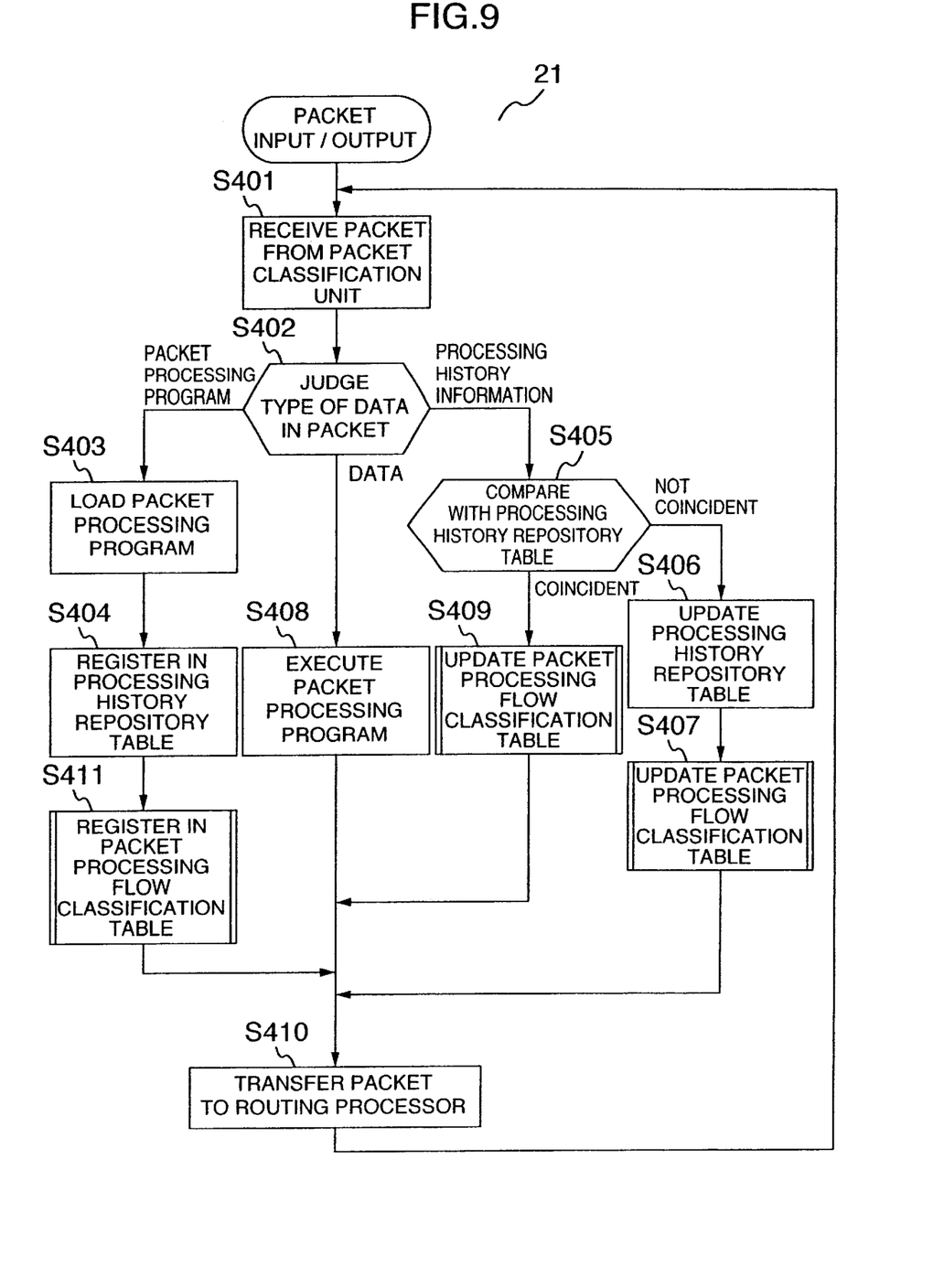
FIG. 9 is a flow chart illustrating the operation to be executed by a packet input/output unit 21 of a packet program processor 20 according to the first embodiment.

First, the operation to be executed by the packet input/output unit 21 of the packet processing program processor 20 will be described with reference to the flow chart of FIG. 9.

The packet input/output unit 21 receives a packet 100 from the packet classification unit 10 (S401), and judges the type of data stored in the packet payload 120 (S402).

The data type may be judged from the packet classifier 111 in the packet header or it may be judged by providing a field representative of the data type at a predetermined position in the packet payload 120.

If the packet processing program 130 is stored in the packet payload 120, the program module name is read and the packet processing program is loaded in the main memory so as to make it executable (S403).

Entries are registered in the processing history repository table 24 shown in FIG. 8 to set values to the fields of the flow classification information 601 and packet processing program information 604 (S404). The setting in the example of the entry 610-2 shown in FIG. 8 means that a program having the program module name "xxx" is executed for the flow belonging to the source address of A-1, the source port of P-1, the destination address of A-2 and the destination port of P-2.

Similar entries (210-P) are set to the packet processing flow classification table 11 shown in FIG. 7 by requesting to the packet processing flow classification table update unit 23 (S411).

The packet 100 containing the program is transferred to the routing processor 5 (S410).

If it is judged that the processing history information is stored in the packet data field 120, this processing history information is compared with the processing history information stored in the processing history repository table 24 (S405).

If the comparison result shows a coincidence, it means that this processing history information has already been stored so that the processing history repository table 24 is not necessary to be updated, and the flow advances to the next step.

Since the process requested to this packet has already been executed at the previous node in the case, the packet processing flow classification table update unit 23 is activated to search the entry having the same flow classification information 201 as that of this packet, and if the value of the packet processor classifier field 202 of the packet processing flow classification table 11 is "packet processing program processor", then it is changed to "routing processor" (S409).

The packet including the processing history information is transferred to the routing processor 5 (S410).

If not the same, the processing history repository table 24 is updated in accordance with the supplied processing history information (S 406). The entries in the flow classification information designated by the packet are updated.

The packet processing flow classification table update unit 23 is activated to update the packet processing flow classification table 11 (S407).

Updating is performed by analyzing the contents of the processing history information 140 contained in the packet 100. This will be detailed by using as an example the entry 610-2 of the processing history repository table 24.

It is assumed that the processing history information 140 of ("1", "1", "1", . . . ) is supplied by the packet belonging to the flow of this entry. This case means that the packet becomes not to be processed by the packet processing program at the previous node, because the third frequency band was changed from "0" to "1". In order to process the packet at this node, if the packet processor classifier field 202 at the entry having the same flow classification information 201 of the packet processing flow classification table 11 as that of this packet, has the value of "routing processor", it is changed to the value of "packet processing program processor".

Alternately, it is assumed that the processing history information 140 of ("1", "0", "0", . . . ) is supplied by the packet belonging to the flow of this entry. This case means that the packet becomes to be processed by the packet processing program at the previous node, because the second frequency band was changed from "1" to "0". In this case, it is not necessary to process the packet of the second frequency band. Therefore, if the packet processor classifier field 202 at the entry having the same flow classification information 201 of the packet processing flow classification table 11 as that of this packet, has the value of "packet processing program processor", it is changed to the value of "routine processor".

Then, the packet 100 including the processing history is transferred to the routing processor 5 (S410). In this manner, the processing history information is transferred to the next node.

If the data 120 is neither the packet processing program 130 such as shown in FIG. 4 nor the processing history information such as shown in FIG. 5, this data is the data to be processed by the packet processing program. In this case, the packet processing program is executed to process the packet 100 (S408), and thereafter the packet 100 is transferred to the routing processor 5 (S410).

After the last step 410 is completed, the flow returns to the step 401 whereat the next packet 100 from the packet classification unit 10 is waited for.

Figure 10:
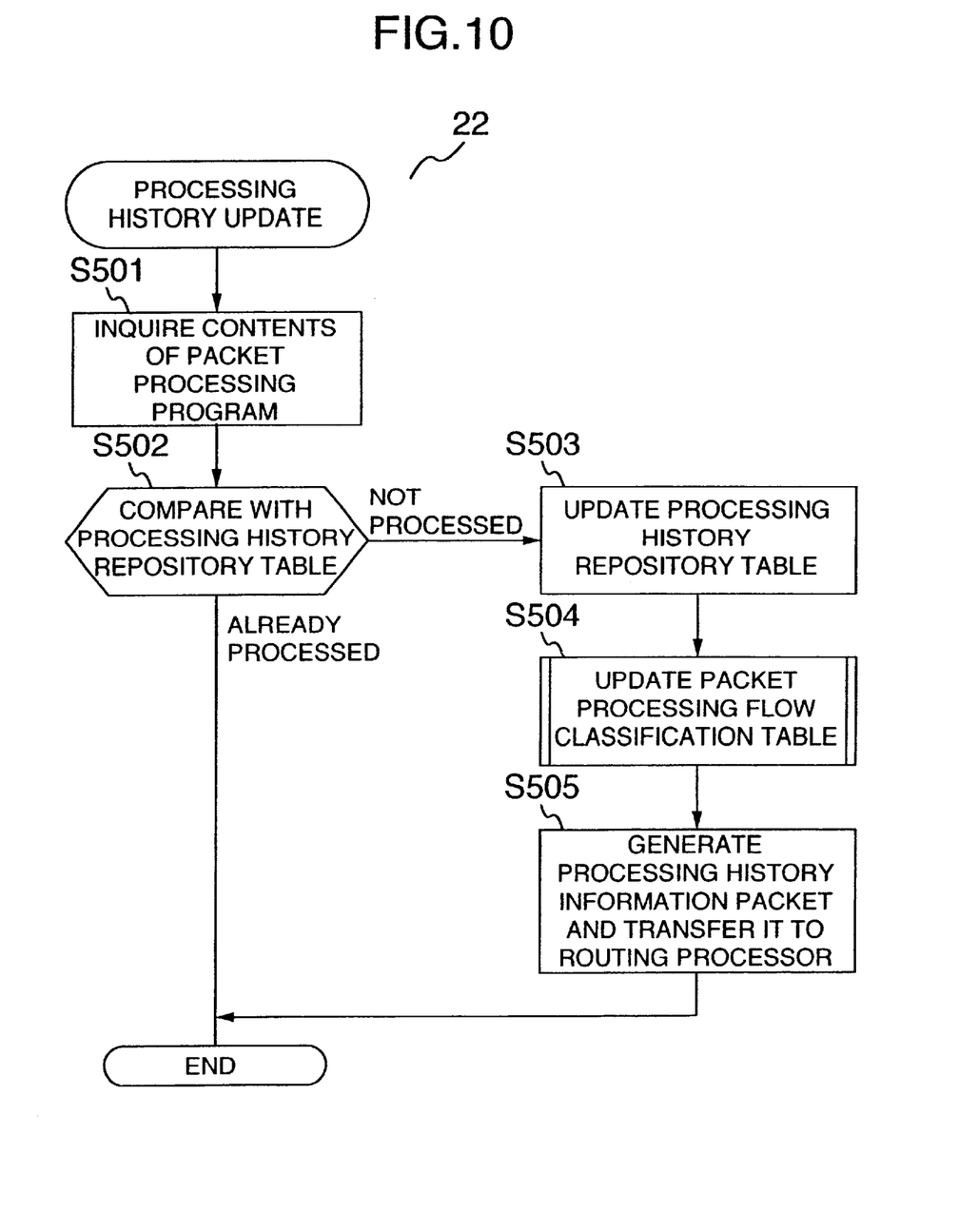
FIG. 10 is a flow chart illustrating the operation to be executed by a processing history update unit 22 of a packet program processor 20 according to the first embodiment.

Next, the operation to be executed by the processing history update unit 22 of the packet processing program processor 20 will be described with reference to the flow chart shown in FIG. 10.

The timing when this operation starts is the timing when the traffic status of the network 2 to which the packet is transmitted changes or the timing when a notice is received from the client computer 52 or server computer 50, or the operation may start periodically at every predetermined time.

First, the processing history update unit 22 supplies the current processing history information to the packet processing program and inquires the process contents (S501). In response to this, the packet processing program checks the traffic of the network and determines how the packet is processed by the packet processing program, the determined process contents being notified to the processing history update unit 22.

The operation will be described, also in this case, by taking as an example the entry 610-2 of the processing history repository table 24.

It is assumed that the packet processing program judges that the packet of the third frequency band is processed in order to reduce the traffic of the network. In this case, the entry of the per-packet processing history information 603 shown in FIG. 8 indicates that the packet of the third frequency band has already been processed by the packet processing program. Therefore, the process is terminated without performing any operation.

Alternatively, it is assumed that the packet processing program judges that the packet of the second frequency band is processed. In this case, the entry of the per-packet processing history information 603 shown in FIG. 8 indicates that the packet of the second frequency band is not still processed by the packet processing program.

In this case, therefore, the processing history update unit 22 changes the value in the per-packet processing history information 603 of the entry 610-2 of the processing history repository table 24 to ("1", "0", "0", . . . ) (S503).

In order to process the packet at this node, if the packet processor classifier field 202 at the entry having the same flow classification information 201 of the packet processing flow classification table 11 as that of this packet, has the value of "routing processor", it is changed to the value of "packet processing program processor" (S504).

Next, a processing history information packet 100 having the processing history information of ("1", "0", "0", . . . ) is created and transferred to the routing processor 5 in order to supply this processing history information to the next node (S505).

In this manner, the process is terminated.

Figure 11:
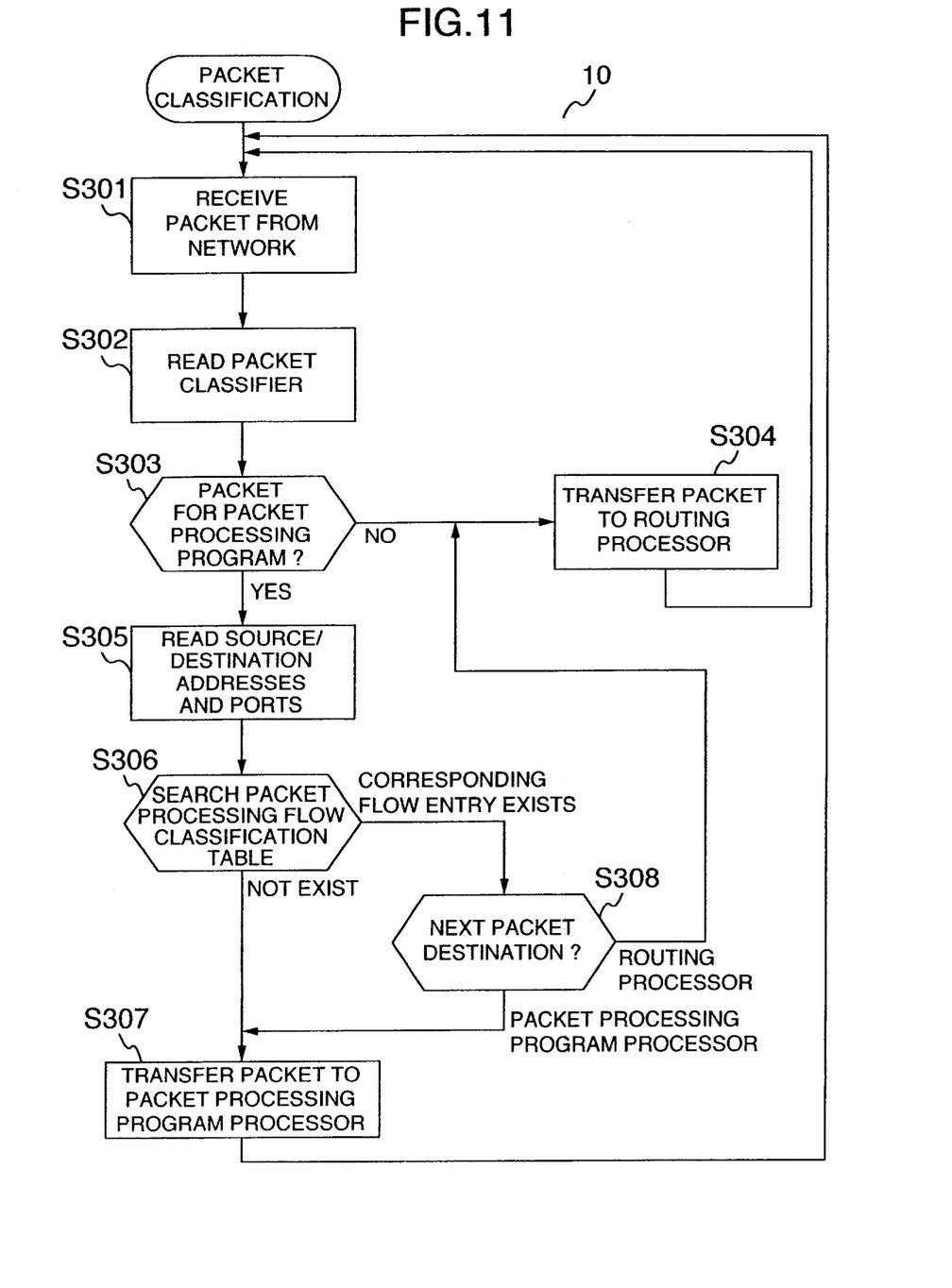
FIG. 11 is a flow chart illustrating the operation to be executed by a packet classification unit 10 according to the first embodiment.

Lastly, the operation to be executed by the packet classification unit 10 will be described with reference to the flow chart shown in FIG. 11.

First, the packet classification unit 10 receives a packet 100 from the network 2 (S301). Next, the packet classification unit 10 reads the packet classifier 111 indicating the packet type (S302) to judge whether the packet is to be processed by the packet processing program 130 (S303). The packet type to be processed by the packet processing program is determined in advance. Alternatively, the packet type may be determined by referring to a correspondence table which is prepared in the packet processing classification table 11 and indicates a correspondence between each packet classifier and a flag indicating whether or not the packet is to be processed by the packet processing program.

If it is judged that the packet 100 is not the target packet to be processed by the packet processing program 130, the packet 100 is transferred to the routing processor 5 (S304) to thereafter return to the step S301 to wait for the next packet.

If it is judged that the packet 100 is the target packet to be processed by the packet processing program 130, the source address 112, source port 113, destination address 114 and destination port 115 are read from the packet header field 110 (S305), and the flow classification information 201 of the packet processing flow classification table 11 is searched to find the corresponding entry 210 (S306).

If the corresponding entry 210 does not exist, the packet 100 is transferred to the packet processing program processor 20 (S307) to thereafter return to the step S301 and wait for the next packet.

If the corresponding entry 210 exists and the packet is the data packet, the contents of the packet processor classifier 202 at that entry are checked. If the contents indicate "packet processing program processor", the packet is transferred to the packet processing program processor 20, whereas if the contents indicate "routing processor", the packet is transferred to the routing processor 5. If the corresponding entry exists and the packet is not the data packet, the packet is transferred to the packet processing program processor 20 (S307).

The contents of the packet processor classifier 202 at this entry are set in accordance with the algorithms described with reference to FIGS. 9 and 10.

(3) Transmission of Data

A series of data transmission sequences will be described with reference to FIG. 15.

Figure 15:
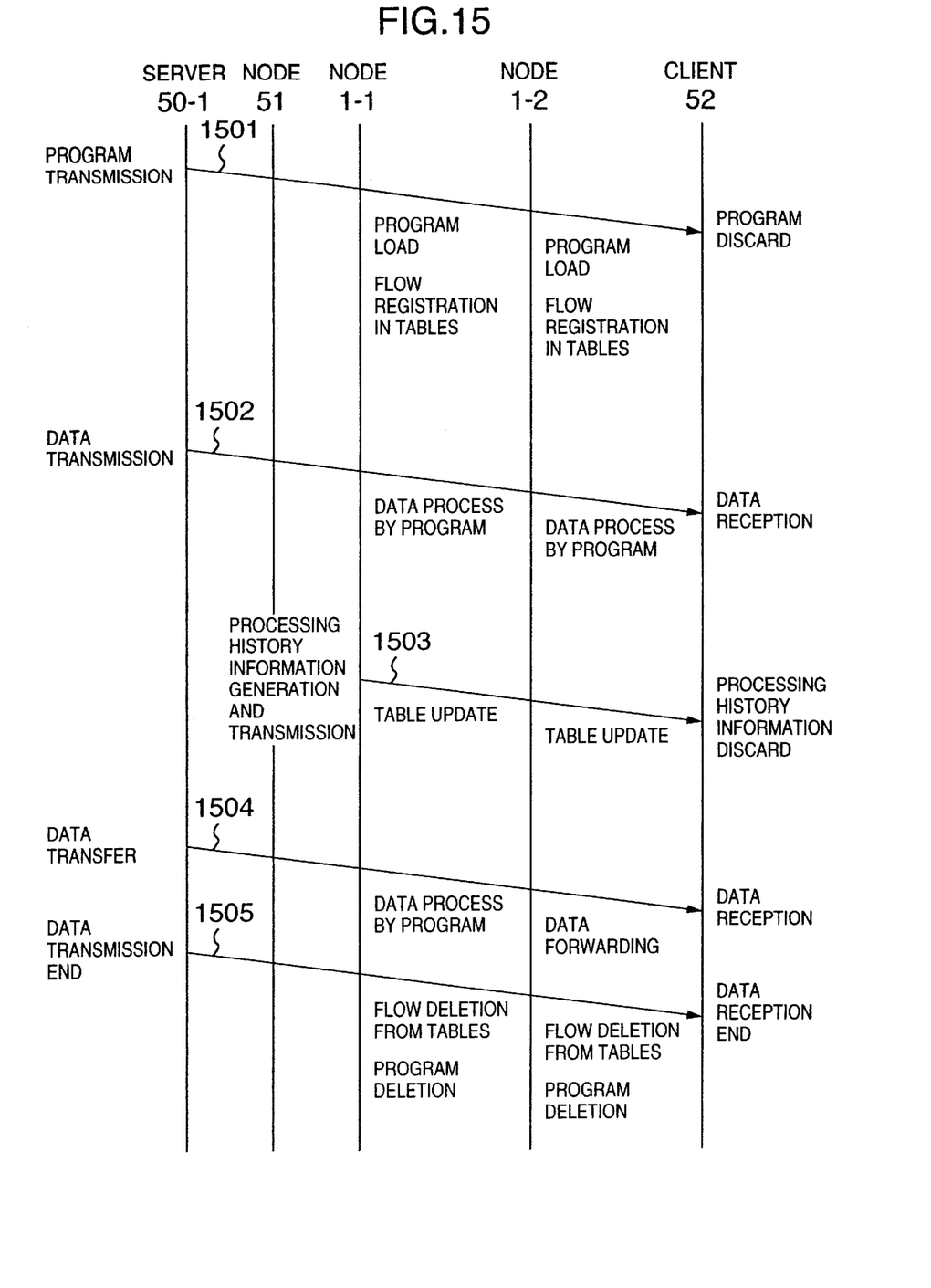
FIG. 15 is a sequence diagram illustrating a data transmission procedure according to this invention.

A server 50-1, nodes 51, 1-1, and 1-2 and a client 52 shown in FIG. 15 correspond to those elements shown in FIG. 2 and having the identical reference numerals. An example of an operation of transmitting data from the server 50-1 to client 52 will be described.

First, the server 50-1 transmits the packet processing program to the client 52 by using a packet having the format shown in FIG. 4 (1501). The conventional type network node 51 transfers the received packet to the next destination. The programmable network nodes 1-1 and 1-2 load the packet processing program contained in the packet in the main memories and register the source/destination addresses and ports in the processing history repository table 24 and packet processing flow classification table 11, and thereafter transfer the packet to the next destination. The client 52 discards the packet containing the program.

Next, the server 50-1 transmits data as the packet having the format shown in FIG. 3 to the client (1502). The conventional type network node 51 transfers the received packet to the next destination. The programmable network nodes 1-1 and 1-2 process the data in the received packet by using the already loaded packet processing program and transfer the packet to the next destination. The client 52 receives the data processed at the nodes 1-1 and 1-2.

It is assumed that the network between the nodes 1-1 and 1-2 is congested. In this case, the node 1-1 changes the process contents in cooperation with the packet processing program, and updates the processing history repository table 24, and if necessary, the packet processing flow classification table 11. Then, the node 11 generates a packet having the format shown in FIG. 5 and containing the processing history information, by using the source/destination addresses and ports in the flow classification information, and transmits the packet to the next destination (1503). Upon reception of the processing history information packet, the node 102 updates, if necessary, the processing history repository table 24 and the packet processing flow classification table 11. The client 52 discards the packet processing information.

The server 50-1 transmits again data (1504). In the example shown in FIG. 15, the node 1-2 stops processing the data by the program and transfers the data to the client 52. This is because the packet processing flow classification table 11 was updated with the packet processing history at 1503.

The server 50-1 transmits the last data or a packet notifying a data transmission end to the client 52 (1505). After the last data was transferred to the next destination, the nodes 1-1 and 1-2 delete the packet processing program in the memory, and delete the corresponding entry of the flow in the processing history repository table 24 and the packet processing flow classification table 11.

For example, TCP is used as the protocol for the-above-described sequences.

(4) Programmable Network Node: Second Embodiment

The second embodiment will be described.

Figure 12:
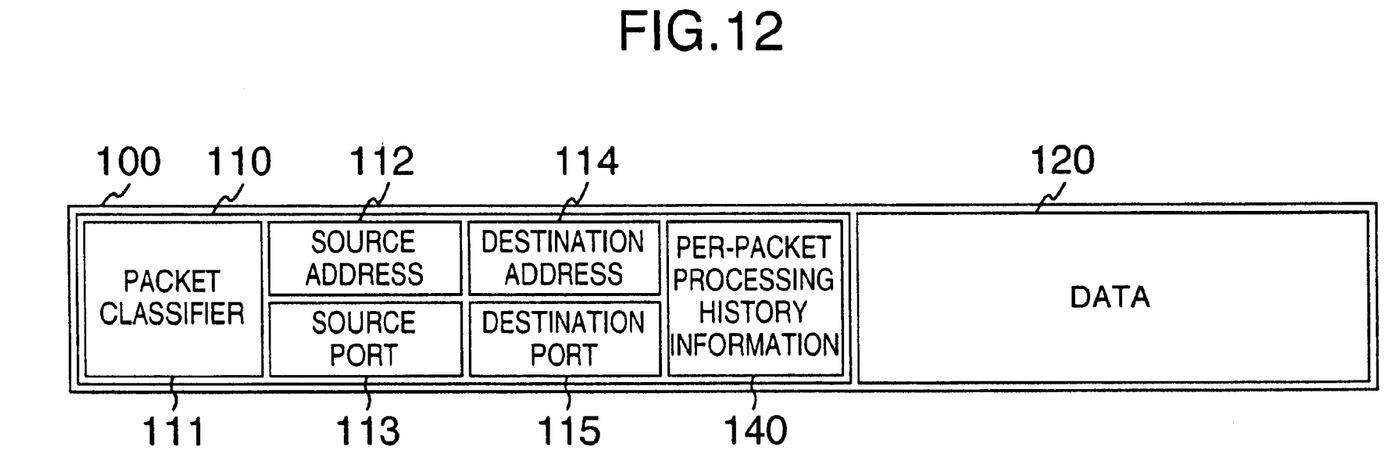
FIG. 12 is a diagram showing the format of the packet 100 according to a second embodiment.

As shown in FIG. 12, although a packet 100 of the second embodiment is generally the same as that of the first embodiment, per-packet processing history information 140 is added to the last of the packet header 110. This per-packet processing history information 140 is updated when the packet is processed by the packet processing program processor, to store the history.

Figure 13:
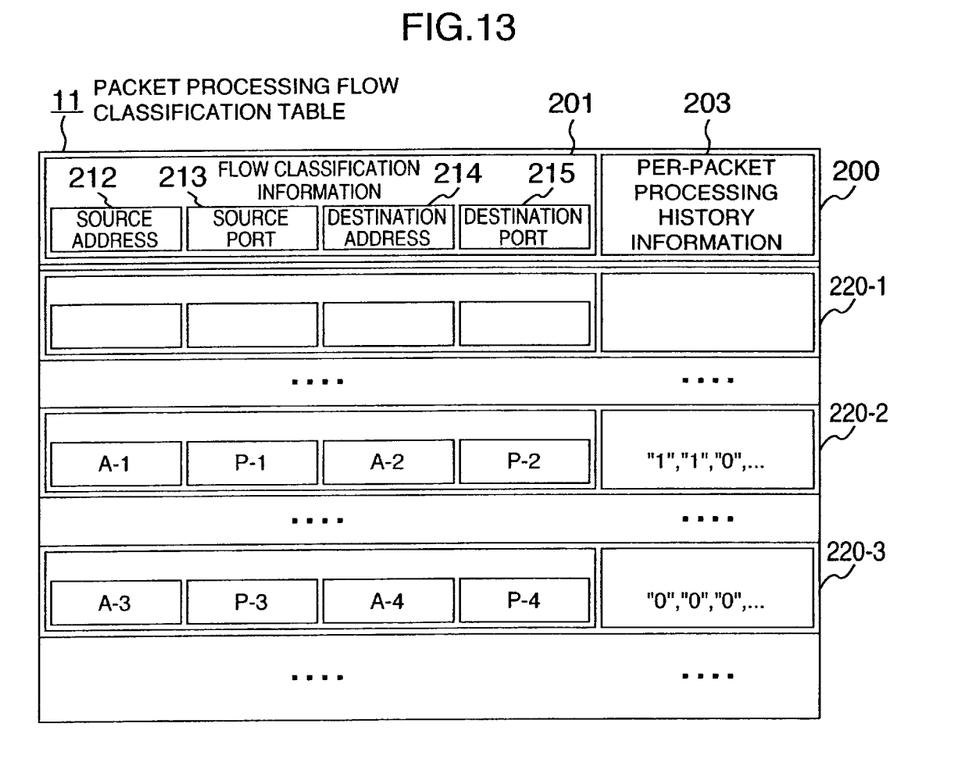
FIG. 13 is a diagram showing the format of a packet processing classification table 11 according to the second embodiment.

As different from the first embodiment, a packet processing flow classification table 11 of the second embodiment shown in FIG. 13 is different from that of the first embodiment in that the last field is per-packet processing history information 203. This means that the packet belonging to the flow classification information 201 is processed in accordance with contents of the per-packet processing history information 203. The next destination is therefore determined through matching the information 203 with the per-packet processing history information 140 in the packet 100. The other constituent elements are similar to those of the first embodiment shown in FIG. 7.

Figure 14:
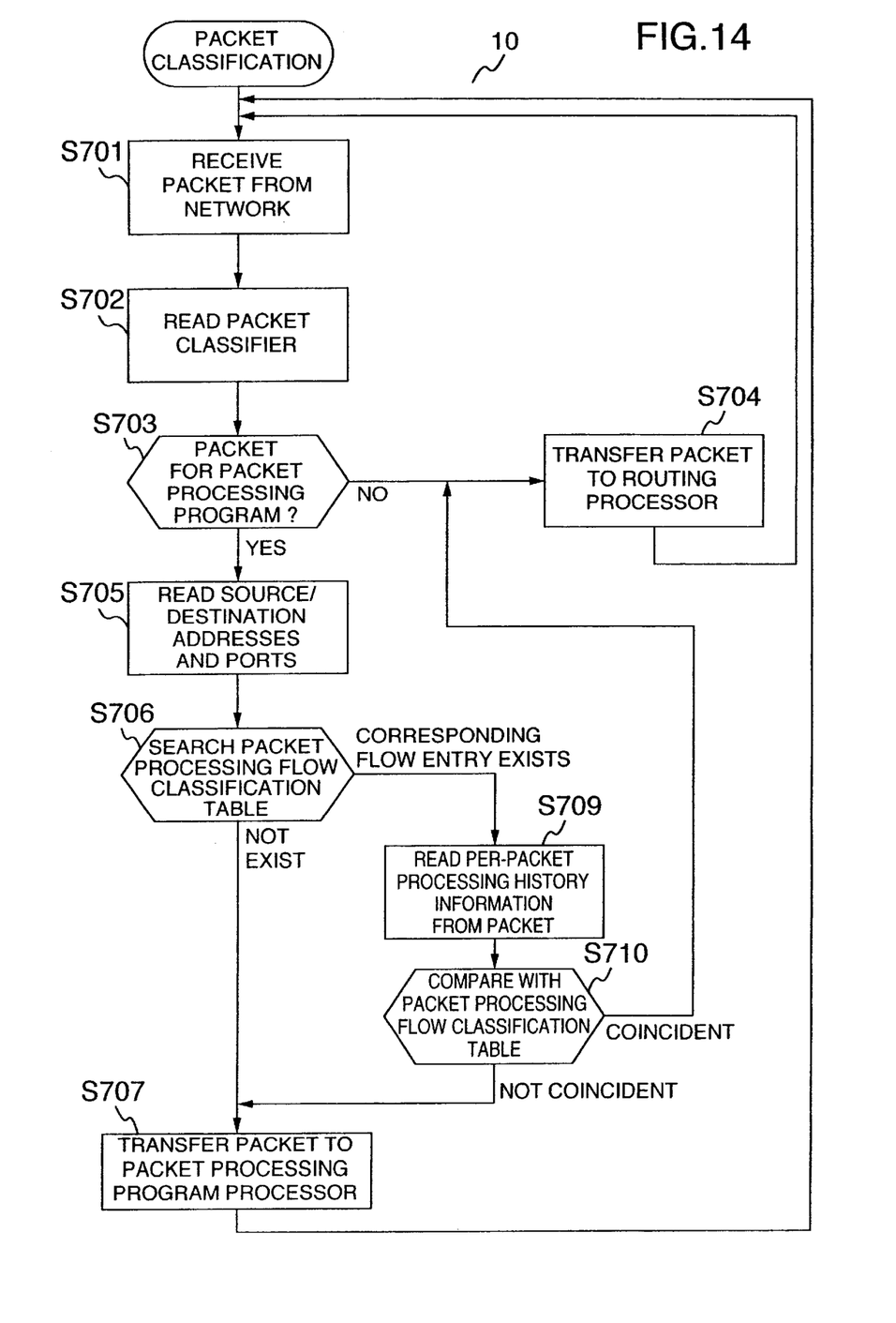
FIG. 14 is a flow chart illustrating the operation to be executed by the packet classification unit 10 according to the second embodiment.

FIG. 14 is a flow chart illustrating the operation to be executed by a packet classification unit 10 of the second embodiment.

First, the packet classification unit 10 receives a packet 100 from the network 2 (S701). Next, the packet classification unit 10 reads the packet classifier 111 indicating the packet type (S702) to judge whether the packet is to be processed by the packet processing program 130 (S703).

If it is judged that the packet 100 is not the target packet to be processed by the packet processing program 130, the packet 100 is transferred to the routing processor 5 (S704) to thereafter return to the step S701 to wait for the next packet.

If it is judged that the packet 100 is the target packet to be processed by the packet processing program 130, the source address 112, source port 113, destination address 114 and destination port 115 are read from the packet header field 110 (S705), and the flow classification information 201 of the packet processing flow classification table 11 is searched to find the corresponding entry 220 (S706).

If the corresponding entry 220 does not exist, the packet 100 is transferred to the packet processing program processor 20 (S707) to thereafter return to the step S701 and wait for the next packet.

It is to be noted that the processes described above are the same as the first embodiment.

If the corresponding entry 220 exists, the per-packet processing history 140 of the packet 100 is read (S710) and compared with the per-packet processing history 203 in the packet processing flow classification table 11 (S710). If coincident, it means that the packet has already been processed. Therefore, the packet is transferred to the routing processor 5 (S704).

If not coincident, the packet is transferred to the packet processing program processor 20 and processed thereat. In the example shown in FIG. 14, if the packet processing information is not coincident, it is presumed that the packet is required to be processed. Therefore, the packet is transferred to the packet processing program processor 20.

In this embodiment, the processing history repository table 24 and its table operation process are unnecessary. The algorithm can therefore be simplified and the structure of a network node can also be simplified.

(5) Modifications

In the example shown in FIG. 15, the program transmission and the data transmission are continuously and consecutively executed. During the program transmission, a flow is registered in the packet processing flow classification table 11 and processing history repository table 24, and after the data transmission, the flow and program are deleted from the tables. However, the program transmission and the data transmission may be executed at different timings. Registration and deletion of a flow to and from the tables and deletion of the program may be performed by the following method. Namely, the server transmits a packet containing an instruction command for such processes to a programmable network node which receives and executes the instruction command.

In the above embodiments, a bitmap indicating a packet processing status for each frequency band is used as the packet processing history. However, the packet processing history may be various formats in accordance with the process contents of the packet processing program. Therefore, the packet processing history may be realized by a script written by text data or any other type.

In the first embodiment shown in FIG. 1, the packet classification units 10 are provided in respective network input interface 3. However, only one packet classification unit 10 may be provided in the routing processor 5. In this case, the network input interface 3 transfers all received packets to the routing processor 5. The routing processor 5 judges using its packet classification unit 10 whether the received packet is to be transferred to the packet processing program processor 20, and transfers only necessary packets to the packet processing program processor 20 and the other packets directly to the network output interface 4.

What is claimed is:

1. A method of processing a packet at a network node constituting a network, comprising:

making executable in advance a packet processing program relative to each packet belonging to a flow; and analyzing an input packet, inputting the input packet belonging to the flow to the packet processing program, and executing a routing process for the input packet not belonging to the flow.

2. A method according to claim 1, further comprising:

receiving the packet processing program via the network and storing a correspondence relation between the flow and the packet processing program.

3. A method of transmitting data on a network including network nodes and computers, the method comprising:

transmitting from a source computer packet processing program corresponding to a flow to a destination computer;

receiving at a programmable network node on a route between the source computer and the destination computer the packet processing program and making the received packet processing program executable;

transmitting from the source program a data packet belonging to the flow to the destination computer; and analyzing at the programmable network node an input data packet and supplying the packet belonging to the flow to the packet processing program.

* * * * *